Oct. 6, 1959
J. T. CABBAGE     2,907,711
PREVENTION OF CAUSTIC EMBRITTLEMENT IN FRACTIONATORS
Filed Oct. 27, 1958
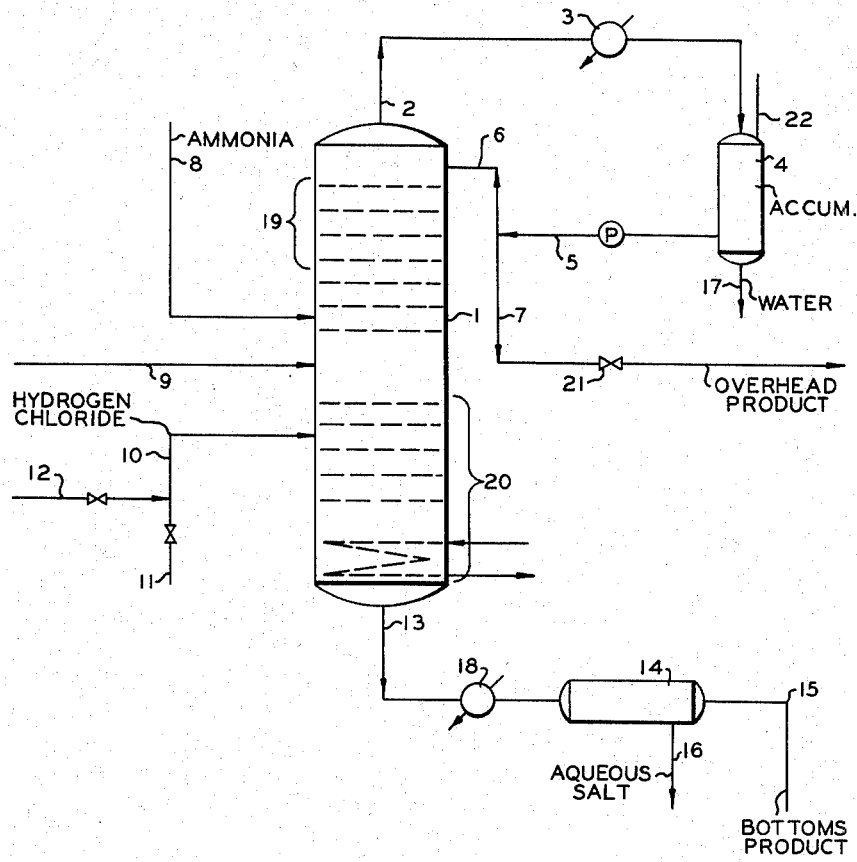
INVENTOR.
J.T. CABBAGE
BY *Hudson & Young*
ATTORNEYS

United States Patent Office 2,907,711
Patented Oct. 6, 1959

2,907,711

PREVENTION OF CAUSTIC EMBRITTLEMENT IN FRACTIONATORS

John T. Cabbage, Bartlesville, Okla., assignor to Phillips Petroleum Company, a corporation of Delaware Application October 27, 1958, Serial No. 769,794

9 Claims. (Cl. 208—370)

This invention relates to a method for the prevention of caustic embrittlement in fractionator towers to which hydrocarbon feed streams containing small amounts of caustic alkali solutions are charged. In one aspect it relates particularly to the prevention of caustic embrittlement in the sections of such fractionating towers below the feed level, in the reboiler section, bottom product withdrawal line and cooler.

Caustic embrittlement is a well-known condition frequently observed in steam boilers. Caustic embrittlement is caused at least in part by the presence of caustic soda (sodium hydroxide) in the boiler feed water which remains in contact with the steel of the boiler tubes and drum for extended periods of time at boiler temperatures. I have observed the effect of caustic embrittlement in fractionating towers operating with hydrocarbon charge stocks which contain small amounts of caustic soda solution. This effect is observed particularly in the section of the fractionator tower below the level of feed introduction, in the reboiler, bottoms product line and cooler. The effect is noted in the reboiler whether the reboiler is an integral part of the fractionator vessel or whether the reboiler is a sepaarte vessel connected by piping to the lower portion of the fractionator.

By the terms caustic alkali solution, caustic solution, aqueous caustic, and caustic soda solution, are meant an aqueous solution of caustic soda (sodium hydroxide), or aqueous solution of sodium carbonate, this latter chemical forming sodium hydroxide or caustic soda by hydrolysis. These terms also include caustic potash (potassium hydroxide), and potassium carbonate. However, in petroleum refining sodium hydroxide, or sodium carbonate, is ordinarily used in place of potassium salts because of its normally lower cost.

An object of this invention is to provide a method for the elimination or prevention of caustic embrittlement in a fractionating tower to which is charged a hydrocarbon feed stream containing an aqueous caustic soda solution.

Another object of this invention is to provide a relatively inexpensive and easily operable method of preventing caustic embrittlement in a fractionating tower to which is charged a hydrocarbon feed stock containing an aqueous caustic soda solution.

Other objects and advantages of my invention will be realized upon reading the following description and attached drawing, which respectively describe and illustrate a preferred embodiment of my invention.

The drawing illustrates, in diagrammatic form, an arrangement of apparatus for carrying out the process of my invention.

According to my invention I introduce into a fractionating vessel, which is charged with a hydrocarbon feed stream containing a caustic soda solution, anhydrous hydrogen chloride at a level below the hydrocarbon feed tray. I prefer to introduce at least a slight excess of the hydrogen chloride over that required to neutralize completely the caustic soda contained in the charge to the fractionator. This excess hydrogen chloride is then neutralized by the addition of ammonia to the portion of the fractionator above the fed level but below a level at which water condensation occurs. This water condensation level can be at any level above the feed level, or it can be in the region of a knock-back reflux condenser, or it can be in the overhead condenser outside of the tower. An excess of ammonia in the tower, as far as corrosion is concerned, is immaterial. The hydrogen chloride reacts or neutralizes the caustic soda with the formation of sodium chloride which is withdrawn from the fractionator as a brine along with the bottoms hydrocarbon product. Upon injection of ammonia into the aforementioned upper portion of the fractionator this reagent reacts with the excess gaseous hydrogen chloride to form ammonium chloride, which in the absence of liquid water will be present as finely divided solid ammonium chloride in suspension. At least a portion of the ammonium chloride passes from the tower with the overhead vaporous product. In this case solid ammonium chloride is usually deposited in the overhead condenser because there is usually only a very small amount of water present in the condenser tubes. Water can be added to the overhead vapor line just prior to the reflux condenser or in the reflux condenser to dissolve the ammonium chloride so that deposition in the condenser will at least be minimized.

I have found further that small quantities of caustic solution remaining in a hydrocarbon stream following a caustic wash causes caustic embrittlement or stressed corrosion in subsequent fractionating operations particularly where water is taken overhead from the fractionating operation. When a closed coil is employed as the fractionator reboiler, free steam is not added and all of the water taken overhead from the fractionator originates from the charge stock.

Thus, when the charge stock contains an aqueous caustic solution, the removal of water overhead from the fractionator causes the caustic solution to become more concentrated as it flows downward in the fractionator. The greater the concentration of the caustic soda in the aqueous solution the greater is the caustic embrittlement or stress corrosion effect in the lower portion of the fractionator. In addition to the caustic embrittlement or stress corrosion becoming evident in the lower portion of the fractionator and in the reboiler, this effect also becomes apparent in the pipes connecting the lower portion of the fractionator with the reboiler in case the reboiler is a spare vessel, and in the bottoms product line from the fractionator and the cooler.

In order to eliminate or prevent this detrimental effect of caustic soda I inject anhydrous hydrogen chloride into the fractionator tower at a point slightly below the feed level and allow the gaseous hydrogen chloride to rise thereby contacting liquid and effecting neutralization of the caustic soda. At the level of the feed tray the vaporous or gaseous hydrogen chloride has its last opportunity to neutralize the sodium hydroxide. At a level above the feed tray and below the water condensation zone I add an excess of ammonia either as aqueous ammonia or as anhydrous ammonia to neutralize all the hydrogen chloride. In this manner I prevent acid corrosion in the fractionator at a level above which acid cannot contact any caustic soda solution from the feed stock. I prefer to inject the ammonia at a level in the fractionator below which water condensation occurs so that all acid will be neutralized before its has an opportunity to dissolve in water and become aqueous hydrochloric acid.

My invention finds particular application to a fractionation tower of a hydrogenation section of a hydrocarbon isomerization process. In this case when the fresh feed contains benzene and organic chlorides it is necessary to hydrogenate benzene of the feed. A nickel supported conventional hydrogenation catalyst is used. In the hydrogenation step some of the organic chlorides are converted to hydrogen chloride which is corrosive in the presence of water. At this point the hydrogenation effluent is caustic washed to prevent acid corrosion. The caustic soda solution is settled from the hydrocarbon. In many cases settling is incomplete and the so-called settled hydrocarbon still contains some caustic soda solution. When such a material is fractionated, caustic embrittlement of the fractionating apparatus occurs. In this case then I add anhydrous hydrogen chloride to the fractionator below the feed level and ammonia to the fractionator above the feed level in the manner hereinbefore described.

I prefer to add the hydrogen chloride to the fractionator tower directly rather than to the hydrocarbon charge line because conditions in the charge line are such that hydrogen chloride corrosion occurs and furthermore, contacting is considerably more effective on a tray than in the charge line.

For the purpose of this invention a valve tray or a sieve tray is more effective for contacting a vapor with a liquid than a bubble cap tray because in the valve tray the caustic solution cannot pass under the plate without contacting upflowing vapor and in the sieve tray there is direct contact of down flowing liquid with upflowing vapors in the plate apertures while in a bubble cap tray the caustic solution can pass under the bubble cap without contacting the upflowing vapors.

My invention finds application to the fractionation of a liquid hydrocarbon stream containing suspended caustic solution, irrespective of the reason for which the stream was caustic washed. For example, streams of liquid hydrocarbon are frequently caustic washed for removal of traces of low portion of mercaptans, hydrogen sulfide. hydrogen chloride (as the herein given example), or for removal of other undesired caustic removable material. When such a caustic washed stream contains even minute amounts of caustic solution, the present invention is applicable as a means for eliminating caustic embrittlement in subsequently used fractionation towers.

My invention also has particular application in the fractionation of any hydrocarbon charge stock which has been caustic washed and imperfectly settled as regards caustic solution.

In the following tabulation is given feed stream composition, a bottoms make product, an overhead make product and a liquid reflux composition. In the fractionation of this feed stock with the production of the aforementioned products, hydrogen chloride and ammonia were added as herein disclosed to prevent caustic embrittlement in the fractionator.

| Component | Tower [1] Feed Liquid, Vol. Percent | Bottoms Make Liquid, Vol. Percent | Overhead [2] Make, Vol. Percent | Reflux Liquid, Vol. Percent |
|---|---|---|---|---|
| Hydrogen | 0.5 | | 35.2 | 0.1 |
| Methane | 0.7 | | 26.2 | 0.6 |
| Ethane | 0.6 | | 13.9 | 2.6 |
| Propane | 0.7 | Trace | 14.9 | 10.1 |
| Isobutane | 0.2 | Trace | 3.6 | 5.7 |
| Normal Butane | 0.2 | Trace | 2.7 | 5.4 |
| Pentanes | 0.1 | 0.1 | 0.1 | 1.4 |
| 2,3-Dimethylbutane | 0.6 | 0.6 | | 0.8 |
| 2-Methylpentane | 5.5 | 5.6 | 0.3 | 6.5 |
| 3-Methylpentane | 14.4 | 14.8 | 0.7 | 13.8 |
| Normal Hexane | 40.8 | 42.1 | 1.5 | 32.0 |
| Methylcyclopentane | 27.3 | 28.1 | 0.8 | 17.6 |
| 2,2-Dimethylpentane | 0.1 | 0.1 | | |
| 2,4-Dimethylpentane | 0.1 | 0.1 | | |
| Cyclohexane | 8.2 | 8.5 | 0.1 | 3.4 |
| Total Percent | 100.0 | 100.0 | 100.0 | 100.0 |
| API at 60/60° F | 73.3 | 70.4 | | 86.6 |
| Molecular Wt | 81.6 | 85.3 | 21.8 | 73.3 |
| Barrels/Day | 4,937 | 4,788 | | 708 |
| S.c.f.d | | | 334,800 | |

[1] Contains entrained caustic soda solution.
[2] Total overhead removed as vapor, no liquid overhead yield. Contains free ammonia.

The fractionator was operated at a top tower temperature of 270° F. at a pressure of 135 p.s.i.g., a bottom tower temperature of 340° F., at a pressure of 140 p.s.i.g., and a reflux accumulator temperature of 100° F. at 130 p.s.i.g. A closed steam coil provided reboiling heat while a conventional condenser produced reflux for cooling the top of the fractionator. To this fractionator was charged 205 barrels per hour isomerization feed stock containing as a caustic soda solution 16 pounds sodium hydroxide in 10 gallons of water. The feed stream was charged to the fractionator at a temperature of 200° F. To this fractionation operation 18 pounds per hour of anhydrous hydrogen chloride are added at the level 3 trays below the hydrocarbon charge level and 4 pounds per hour of ammonia as anhydrous ammonia are added to the tower at a level one tray above the feed level.

Referring to the drawing, a fractionating tower is provided with conventional valve-type tray vapor-liquid contacting apparatus or with such other suitable vapor-liquid packing as desired. The several upper trays identified in the drawing by reference numeral 19 are the trays upon which water vapor is condensed to liquid by the down flowing reflux. The portion of the column below the feed level and identified by reference numeral 20 is the portion of the fractionator in which water is evaporated from the caustic soda solution contained in the charge stock. Hydrocarbon feed containing the caustic soda solution is fed to a fractionator 1 through a charge line 9. Anhydrous hydrogen chloride is introduced to the system from an extraneous source through a pipe 12 or from a process point, in an operation not shown, through a pipe 11. This hydrogen chloride is fed into the fractionator 1 through a pipe 10 several trays below the hydrocarbon feed level. Anhydrous ammonia or aqueous ammonia as desired is charged to the fractionator through a pipe 8 at least one tray above the hydro carbon charge level. Overhead vaporous material is taken from the tower through a pipe 2, at least a portion thereof being condensed in a condenser 3 with condensate and uncondensed gases being passed to accumulator 4. In the accumulator condensate is separated from uncondensed gas, aqueous material being withdrawn through a pipe 17, and condensed hydrocarbon being passed through a pipe 5 and a pipe 6 for reflux cooling. In case a liquid overhead product is desired a portion of the condensate passing through pipe 5 is passed through a pipe 7 provided with a valve 21 to product disposal, as desired. Bottoms material is withdrawn from the column through a pipe 13, and is passed through a cooler 18 into a settler vessel 14 in which aqueous salt solution is settled from the hydrocarbon bottoms product. Aqueous salt solution is withdrawn through a pipe 16 while the bottoms hydrocarbon product is withdrawn through a pipe 15 for such disposal as desired.

Uncondensed gases are removed from accumulator 4 as an overhead product through a pipe 22 for such disposal as desired.

In the particular example given hereinabove all of the condensate produced in condenser 3 was returned from the accumulator to the fractionator as reflux without the production of a liquid overhead product.

While certain embodiments of the invention have been described for illustrative purposes the invention obviously is not limited thereto.

I claim:
1. In the fractionation of a hydrocarbon feed stream containing a minor concentration of an aqueous caustic alkali solution wherein caustic embrittlement occurs in portions of the fractionator below the feed level and in the reboiler section, a method for protecting said fractionator from caustic embrittlement comprising introducing said feed stream into said fractionator at a level intermediate its ends, maintaining said fractionator under fractionation conditions by adding reboiling heat and reflux cooling thereto, introducing sufficient anhydrous hydrogen chloride into said fractionator at a level below the feed level to neutralize said caustic alkali solution.

2. In the fractionation of a hydrocarbon feed stream containing a minor concentration of an aqueous caustic alkali solution wherein caustic embrittlement occurs in portions of the fractionator below the feed level and in the reboiler section, a method for protecting said fractionator from caustic embrittlement comprising introducing said feed stream into said fractionator at a level intermediate its ends, maintaining said fractionator under fractionation conditions by adding reboiling heat and reflux cooling thereto, introducing sufficient anhydrous hydrogen chloride into said fractionator at a level below the feed level to neutralize said caustic alkali solution, withdrawing an overhead product and withdrawing bottoms material comprising hydrocarbon bottoms product and an aqueous salt solution from the kettle section of said fractionator, separating the aqueous salt solution from said hydrocarbon bottoms product and recovering the latter as another product of the operation.

3. In the fractionation of a hydrocarbon liquid feed stream containing a minor concentration of an aqueous caustic soda solution wherein caustic embrittlement occurs in portions of the fractionator below the feed level and in the reboiler section, a method for protecting said fractionator from caustic embrittlement comprising introducing said feed stream into said fractionator at a level intermediate its ends, maintaining said fractionator under fractionation conditions by adding reboiling heat and reflux cooling thereto, introducing sufficient anhydrous hydrogen chloride into said fractionator at a level below the feed level to neutralize said caustic alkali solution, withdrawing an overhead product and withdrawing bottoms material comprising hydrocarbon bottoms product and an aqueous salt solution from the kettle section of said fractionator, separating the aqueous salt solution from said hydrocarbon bottoms product and recovering the latter as another product of the operation.

4. In the fractionation of a hydrocarbon liquid feed stream containing a minor concentration of an aqueous caustic alkali solution wherein caustic embrittlement occurs in portions of the fractionator below the feed level and in the reboiler section, a method for protecting said fractionator from caustic embrittlement comprising introducing said feed stream into said fractionator at a level intermediate its ends, maintaining said fractionator under fractionation conditions by adding reboiling heat thereto and to vaporize water at a level below the feed level and by adding a reflux cooling thereto and to condense water at a level above the feed level, adding sufficient anhydrous hydrogen chloride into said fractionator at a level below said feed level to neutralize said caustic alkali solution, withdrawing an overhead product and withdrawing bottoms material comprising hydrocarbon bottoms product and an aqueous salt solution.

5. In the fractionation of a hydrocarbon liquid feed stream containing a minor concentration of an aqueous caustic alkali solution wherein caustic embrittlement occurs in portions of the fractionator below the feed level and in the reboiler section, a method for protecting said fractionator from caustic embrittlement comprising introducing said feed stream into said fractionator at a level intermediate its ends, maintaining said fractionator under fractionation conditions by adding reboiling heat thereto and to vaporize water at a level below said feed level and reflux cooling thereto and to condense water at a level above said feed level, introducing an excess of anhydrous hydrogen chloride over that required to neutralize said caustic alkali solution into said fractionator at a level below the feed level, introducing sufficient ammonia into said fractionator at a level above said feed level and below the water condensing level to neutralize said excess hydrogen chloride.

6. In the fractionation of a hydrocarbon liquid feed stream containing a minor concentration of an aqueous alkali solution wherein caustic embrittlement occurs in portions of the fractionator below the feed level and in the reboiler section, a method for protecting said fractionator from caustic embrittlement comprising introducing said feed stream into said fractionator at a level intermediate its ends, maintaining said fractionator under fractionation conditions by adding reboiling heat and reflux cooling thereto, introducing an excess of anhydrous hydrogen chloride over that required to neutralize said caustic alkali solution into said fractionator at a level below the feed level, introducing sufficient ammonia into said fractionator at a level above said feed level to neutralize said excess of hydrogen chloride, withdrawing an overhead product, and withdrawing bottoms material comprising hydrocarbon bottoms product and an aqueous salt solution from the kettle section of said fractionator, separating the aqueous salt solution from said hydrocarbon bottoms product and recovering the latter as another product of the operation.

7. In the fractionation of a hydrocarbon liquid feed stream containing a minor concentration of an aqueous caustic alkali solution wherein caustic embrittlement occurs in portions of the fractionator below the feed level and in the reboiler section, a method for protecting said fractionator from caustic embrittlement comprising introducing said feed stream into said fractionator at a level intermediate its ends, maintaining said fractionator under fractionation conditions by adding reboiling heat thereto and to vaporize water at a level below the feed level and by adding reflux cooling thereto and to condense water at a level above the feed level, adding an excess of anhydrous hydrogen chloride over that required to neutralize said caustic alkali solution into said fractionator at a level below the feed level, introducing sufficient ammonia into said fractionator at a level above said feed level and below the water condensing level to neutralize said excess of hydrogen chloride, withdrawing an overhead product, and withdrawing bottoms material comprising hydrocarbon bottoms product and an aqueous salt solution from the kettle section of said fractionator, separating the aqueous salt solution from said hydrocarbon bottoms product and recovering the latter as another product of the operation.

8. In the operation of claim 7 wherein the caustic alkali is sodium hydroxide.

9. In the operation of claim 7 wherein the caustic alakli is sodium carbonate.

References Cited in the file of this patent

UNITED STATES PATENTS

| | | |
|---|---|---|
| 1,936,210 | Retaillian | Nov. 21, 1933 |
| 2,249,277 | Ryan et al. | July 15, 1941 |
| 2,385,175 | Wachter et al. | Sept. 18, 1945 |
| 2,662,042 | Dougherty et al. | Dec. 8, 1953 |
| 2,773,806 | Kline et al. | Dec. 11, 1956 |